(12) United States Patent
Park et al.

(10) Patent No.: US 9,534,087 B2
(45) Date of Patent: Jan. 3, 2017

(54) METHOD FOR MANUFACTURING POLYSILSESQUIOXANE BY USING CARBON DIOXIDE SOLVENT AND POLYSILSESQUIOXANE MANUFACTURED USING THE SAME

(71) Applicant: KOREA INSTITUTE OF INDUSTRIAL TECHNOLOGY, Cheonan-si, Chungcheongnam-do (KR)

(72) Inventors: In Park, Seoul (KR); Ha Soo Hwang, Incheon (KR)

(73) Assignee: KOREA INSTITUTE OF INDUSTRIAL TECHNOLOGY, Cheonan-Si, Chungcheongnam-Do (KR)

( * ) Notice: Subject to any disclaimer, the term of this patent is extended or adjusted under 35 U.S.C. 154(b) by 227 days.

(21) Appl. No.: 14/350,564

(22) PCT Filed: Apr. 18, 2013

(86) PCT No.: PCT/KR2013/003280
§ 371 (c)(1),
(2) Date: Apr. 9, 2014

(87) PCT Pub. No.: WO2014/092254
PCT Pub. Date: Jun. 19, 2014

(65) Prior Publication Data
US 2016/0096930 A1     Apr. 7, 2016

(30) Foreign Application Priority Data
Dec. 13, 2012  (KR) .................. 10-2012-0145033

(51) Int. Cl.
*C08G 77/06* (2006.01)
*C08G 77/00* (2006.01)
(Continued)

(52) U.S. Cl.
CPC ............. *C08G 77/08* (2013.01); *C08G 77/045* (2013.01); *C08G 77/06* (2013.01); *C08G 77/24* (2013.01);
(Continued)

(58) Field of Classification Search
CPC ....... C08G 77/06; C08G 77/08; C08G 77/045; C08G 77/24; C08G 77/26; C08G 77/28; Y02P 20/544
(Continued)

(56) References Cited

U.S. PATENT DOCUMENTS

| 5,371,154 A | 12/1994 | Brandvold et al. |
| 2008/0038664 A1 | 2/2008 | Hamada et al. |
| 2010/0280161 A1* | 11/2010 | Abe .......................... C07F 7/21 524/265 |

FOREIGN PATENT DOCUMENTS

| JP | 2004-196958 A | 7/2004 |
| JP | 2007-015991 A | 1/2007 |

(Continued)

OTHER PUBLICATIONS

Abe et al., JP 2007-015991 A machine translation in English, Jan. 25, 2007.*
(Continued)

*Primary Examiner* — David Karst
(74) *Attorney, Agent, or Firm* — Revolution IP, PLLC

(57) ABSTRACT

Disclosed is a method for manufacturing the polysilsesquioxane (PSSQ) within the carbon dioxide solvent through the control of the pressure and temperature within a reactor by the state changes, e.g., a liquid state or supercritical state, of carbon dioxide as a solvent which is environmentally friendly and pollution-free, that is to say, by making use of the fact that the solubility of reactant and product is changed
(Continued)

according to the pressure and temperature in manufacturing the polysilsesquioxane (PSSQ).

12 Claims, 12 Drawing Sheets

(51) Int. Cl.
    *C08G 77/26*     (2006.01)
    *C08G 77/08*     (2006.01)
    *C08G 77/04*     (2006.01)
    *C08G 77/24*     (2006.01)
    *C08G 77/28*     (2006.01)

(52) U.S. Cl.
    CPC ............... *C08G 77/26* (2013.01); *C08G 77/28* (2013.01); *Y02P 20/544* (2015.11)

(58) Field of Classification Search
    USPC ......... 525/12; 528/12, 10, 30, 38, 40, 42, 43
    See application file for complete search history.

(56) References Cited

FOREIGN PATENT DOCUMENTS

| | | |
|---|---|---|
| JP | 2009-035515 A | 2/2009 |
| JP | 2010-083981 A | 4/2010 |
| KR | 10-0889217 B1 | 3/2009 |
| KR | 10-2009-0056901 A | 6/2009 |

OTHER PUBLICATIONS

Loy, D. A. et al., "Direct Formation of Aerogels by Sol-Gel Polymerizations of Alkoxysilanes in Supercritical Carbon Dioxide", Chem. Mater. 1997, vol. 9, pp. 2264-2268.

\* cited by examiner

METHOD FOR MANUFACTURING POLYSILSESQUIOXANE BY USING CARBON DIOXIDE SOLVENT AND POLYSILSESQUIOXANE MANUFACTURED USING THE SAME

CROSS REFERENCE TO PRIOR APPLICATIONS

This application is a National Stage Application of PCT International Patent Application No. PCT/KR2013/003280 filed on Apr. 18, 2013, under 35 U.S.C. §371, which claims priority to Korean Patent Application No. 10-2012-0145033 filed on Dec. 13, 2012, which are all hereby incorporated by reference in their entirety.

TECHNICAL FIELD

Recently, resin which is smaller and lighter and has a high performance and thermal resistance is increasingly required in the fields of communication, electric and electronic industries. However, while plastic of a carbon skeleton has a limited thermal resistance, it is known that plastic of silicon skeleton has a possibility of realizing higher performance. Silsesquioxane is a silicone compound of which the ratio of oxygen atoms to silicon atoms is 1.5 and the empirical formula of the silsesquioxane is $RSiO_{3/2}$ (Here, R represents hydrogen or alkyl, alkene, aryl, arylene group). Since the silsesquioxane has excellent thermal resistance, it is widely used as a heat-resistant material like an insulation protective layer or inter-insulation layer of semiconductor, etc. The silsesquioxane has sufficient easiness of synthesis to be copolymerizable with common polymers, and has excellent thermal, mechanical and electrical properties. The silsesquioxane is widely used in a variety of fields of aerospace, germicide, optical materials, microelectronic engineering materials, semiconductor materials, cosmetics, catalyst science materials, etc.

In general, polysilsesquioxane (PSSQ) represented by $[RSiO_{3/2}]n$ can be largely divided into three types of a basket type, a ladder type and a random type. Among them, a basket type polysilsesquioxane (completely condensed POSS) has a specific and controlled molecular structure due to a strong skeleton, so that it is used as a building block of the polymer. Thus, it is possible to control the polymer structure. Accordingly, so long as the structure can be controlled, a quite different property can be expected. The present invention relates to a method for manufacturing the polysilsesquioxane (PSSQ) by using a carbon dioxide solvent.

BACKGROUND ART

While carbon dioxide ($CO_2$) solvent is environmentally friendly and pollution-free, it has very much lower solvency than other polar solvents and has a problem in dissolving a polar compound or inactive compound. However, it has been known that a polymer of a kind of silicon like polydimethylsiloxane and a partially fluorinated compound have a good solubility for liquid carbon dioxide and supercritical carbon dioxide.

When the temperature and pressure are higher than those of a critical point, a state where densities of the two states become the same as each other and there is no distinction between the two states is referred to as a supercritical state, and is also called supercritical fluid (SCF) because the state has the characteristics of a fluid which is easy to transform unlike a solid body and freely flows.

The molecule in the supercritical state has a density close to that of liquid and a viscosity lower than that of liquid, and thus, it has properties close to gas. The molecule in the supercritical state is rapidly diffused to have high thermal conductivity, so that it can be usefully used in chemical reactions. The carbon dioxide has a low critical temperature (31.1° C.) and a low critical pressure (73.8 bar). Therefore, the carbon dioxide is able to easily reach the liquid state and the supercritical state. Also, due to the high compressibility of the carbon dioxide, the density or solvent strength of the carbon dioxide is easy to change according to the change of the pressure. The carbon dioxide is changed into gas carbon dioxide by reducing the pressure.

Also, the carbon dioxide is nonpoisonous, nonflammable, inexpensive and environmentally friendly. Under the condition of a temperature and a pressure higher than those of the critical condition (TC=31.1° C., PC=73.8 bar) of the carbon dioxide, the carbon dioxide becomes the supercritical state. The carbon dioxide in the supercritical state has unique properties different from those of the liquid or gas carbon dioxide. The supercritical carbon dioxide has a density similar to that of the liquid carbon dioxide, a viscosity as low as that of the gas carbon dioxide, and is rapidly diffused.

Meanwhile, a large number of organic or halogen solvent are annually used as a polymer polymerization solvent all over the world. All of the solvents being used are dangerous to health and safety, and are harmful to the environment. In particular, petroleum-based solvents are flammable and generate smog. When a non-volatile solvent such as an aqueous solution is used instead of the volatile solvent, wastewater is produced and there is a big disadvantage that a lot of time and energy is required for drying after cleaning.

Also, most functionalizations in the siloxane structure have been performed through POSS up to now. However, since the siloxane has a low molecular weight and has a relatively low glass transition temperature and melting point, the siloxane is not suitable for the application to the thin film within an electronic material such as OLED and organic solar cell, so that there is a problem in practicability.

As compared with an existing linear siloxane, a ladder type silicon polymer structurally secures the safety. Accordingly, the trapezoidal silicon polymer has a high thermal stability, and the use of the trapezoidal silicon polymer is expanding very rapidly due to high compatibility with the organic solvent. Also, since the improvement of characteristics of the polysilsesquioxane (PSSQ) results from a highly regular ladder-form structure, research has been variously devoted to both the development of a new starting material capable of easily forming the ladder-form structure and a method for condensing the new starting material.

Polyorganosilsesquioxane, a kind of the polyorganosilsesquioxane, is easily typically manufactured as follows. A precursor hydrolyzate is obtained by hydrolyzing trichlorosilane or rialkoxysilane, and the precursor hydrolyzate is dehydrocondensed under an alkali/acid catalyst, so that polymer having a low molecular weight (Mn is from about 20,000 to 30,000, and Mn/Mw is from about 3 to 5) can be easily manufactured.

First, a method for manufacturing the polyorganosilsesquioxane by using the trichlorosilane will be described as follows. In the hydrolysis of the trichlorosilane, oligomer (Mn is from 1,000 to 2,000, and PDI is from 2 to 5) produced by the condensation reaction performed simultaneously with the hydrolysis has a complex and various structures instead of silanetriol of a single structure, and when it becomes to have a high molecular weight by using this, it is easy to form a 3-dimensional network structure due to the structural defect (inter-hydroxy group) of the oligomer, which is caused by the existence of hydroxy group within the molecule, and any structure of its own. Therefore, the following disadvantages are caused. That is, 1) it is impossible to control the structure of the produced polymer 2) it is difficult to control the molecular weight of produced polymer and to obtain the polymer having a high molecular weight, therefore 3) the produced polymer loses high regularity, so that the solubility in the solvent is reduced 4) in particular, the low molecular weight residues have a bad influence on the thermal resistance and mechanical properties of the polymer.

Second, a prior method for manufacturing the polyorganosilsesquioxane by using the trialkoxysilane has also the advantage of being easier to handle, for example, hydrolysis rate control, than the trichlorosilane. However, due to both the molecular defect of the oligomer, which is caused by the existence of the hydroxyl group within the structure of the produced polymer, and the existence of alkoxy group, the following disadvantages are caused. That is, 1) the polymer having a branch-form instead of the ladder-form is produced 2) there are requirements for the selection and amount of the catalyst to be used, the selection of the reaction solvent, and a precise pH adjustment of the reaction solution, however, the adjustment is not easy 3) the method using the trialkoxysilane is not suitable for the manufacture of the highly regular silicon ladder-form polymer, for example, a micro gel is formed by forming a network structure which is 3-dimensional to some degree, and the like. Also, according to both various synthesis methods known up to now, for example, a sol-gel method, a ring opening polymerization method, an equilibrium polymerization method, etc., and what is known through the research on their structures, the condensation process is very complex and various and the structure of the polymer is not sufficiently controlled, so that products now being marketed does not comply with various conditions for being used as industrial new material. This problem acts as a certain limit to practicalization.

In the publication of Korean patent application No. 10-2009-0056901, disclosed is a polyalkylsilsesquioxane particle and a method for manufacturing the same. More specifically, the patent application provides a method for manufacturing the polyalkylsilsesquioxane through the first reaction in which, after an acid homogeneous aqueous solution is prepared by adding an acid catalyst to an aqueous medium, the hydrolysis is performed by adding alkyltrialkoxysilane to the aqueous solution, the second reaction in which a polycondensation is performed under an alkali catalyst, and the third reaction in which end-capping is performed by adding alkoxytrialkylsilane including triorganosilyl group, and provides the polyalkylsilsesquioxane particle manufactured by the method. According to the invention, by adding diol having 3 or more than carbon atoms before supplying the alkyltrialkoxysilane, polyalkylsilsesquioxane particle can be obtained which has a large diameter and a narrow distribution of particle sizes, while maintaining the property equal to or greater than the existing property. However, since the final result is limited to the polyalkylsilsesquioxane and the acid catalyst is used, the range is limited. Also, there are requirements for the selection and amount of the catalyst to be used, the selection of the reaction solvent, and a precise pH adjustment of the reaction solution, however, the adjustment is not easy. Further, there still remains a problem that the produced polymer loses high regularity, so that the solubility in the solvent is reduced. In particular, the invention does not disclose the structure and shape of the final result, so that structural stability is not obtained.

DISCLOSURE

Technical Problem

The present invention provides a method for manufacturing the polysilsesquioxane (PSSQ) within the carbon dioxide solvent through the control of the pressure and temperature within a reactor by the state changes, e.g., a liquid state or supercritical state, of carbon dioxide as a solvent which is environmentally friendly and pollution-free, that is to say, by making use of the fact that the solubility of reactant and product is changed according to the pressure and temperature in manufacturing the polysilsesquioxane (PSSQ).

Technical Solution

Polysilsesquioxane (PSSQ) is manufactured by using insoluble carbon oxide as a solvent in order to introduce an environmentally-friendly and pollution-free process having no risk of explosion in the manufacture of the polysilsesquioxane (PSSQ). The method for manufacturing the polysilsesquioxane (PSSQ) includes: preparing a silane compound; preparing a carbon dioxide solvent; injecting the silane compound into a reactor; increasing a pressure and temperature within the reactor, and changing a state of the carbon dioxide solvent into a liquid state or a supercritical state by injecting the carbon dioxide solvent into the reactor; supplying water and a catalyst to the reactor; inducing hydrolysis and a condensation reaction by increasing the temperature within the reactor; precipitating a polysilsesquioxane (PSSQ) product substituted with a functional group by controlling the temperature and pressure within the reactor; and separating the silane compound of an unreacted material within the reactor from the polysilsesquioxane (PSSQ) of product.

The supercritical carbon dioxide solvent of the present invention may be in the supercritical state. The carbon dioxide solvent may include a semi-supercritical fluid which can be treated almost the same as the supercritical fluid because the semi-supercritical fluid is in a state where the temperature and pressure are slightly lower than the critical temperature and the critical pressure, or because the state transition and state change of the semi-supercritical fluid occur for a very short time.

Advantageous Effect

The present invention provides a method for manufacturing the polysilsesquioxane (PSSQ) within the carbon dioxide solvent through the control of the pressure and temperature within a reactor by the state changes, e.g., a liquid state or supercritical state, of carbon dioxide as a solvent which is environmentally friendly and pollution-free, that is to say, by making use of the fact that the solubility of reactant and product is changed according to the pressure and temperature in manufacturing the polysilsesquioxane (PSSQ).

Through the mentioned method, it is possible to easily remove unreacted materials and to obtain the high-purity and high yield polysilsesquioxane (PSSQ).

BEST MODE

Figure 1:
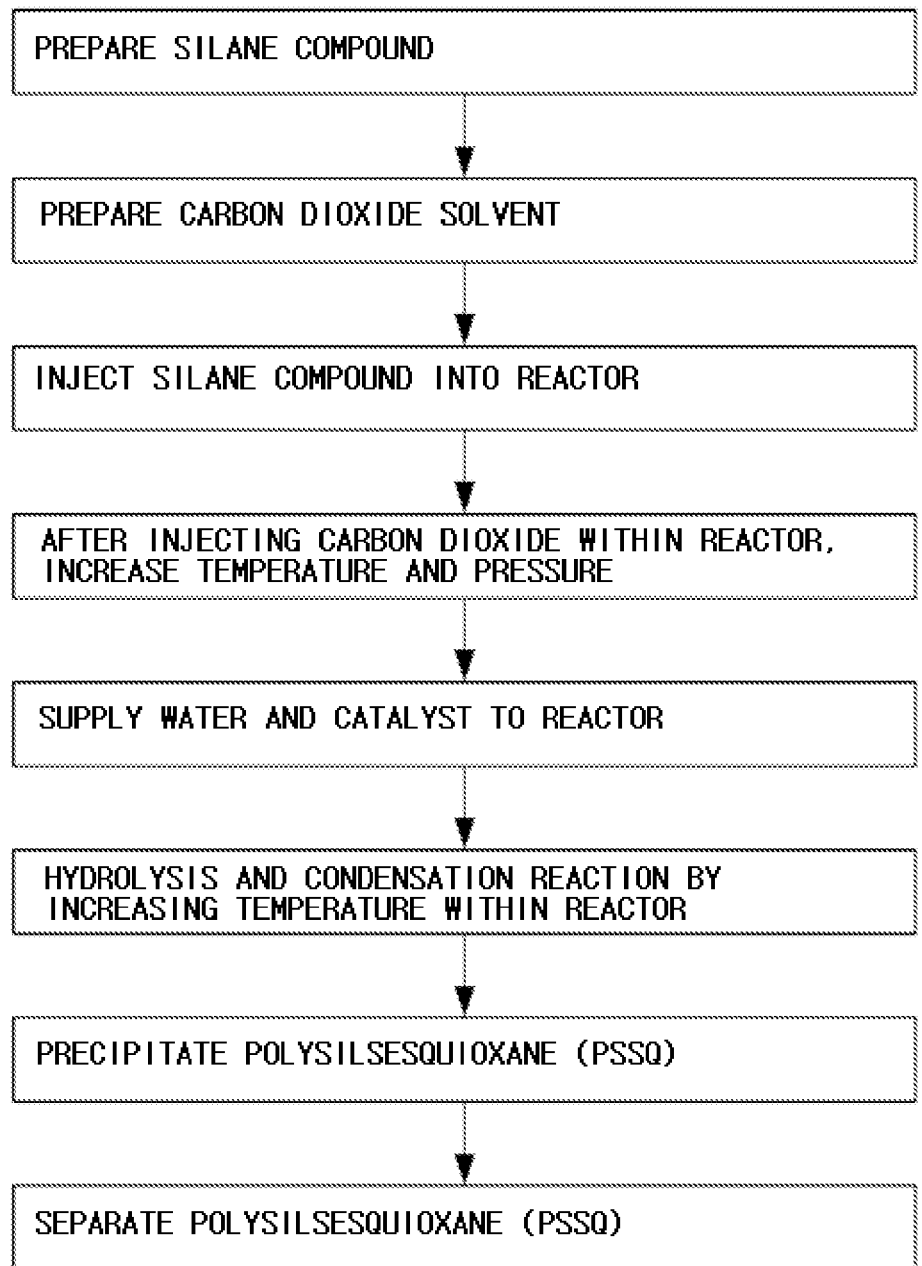
FIG. 1 shows a method for manufacturing polysilsesquioxane by using a carbon dioxide solvent in accordance with the present invention.

FIG. 1 shows a method for manufacturing polysilsesquioxane by using a carbon dioxide solvent in accordance with the present invention. The method for manufacturing the polysilsesquioxane (PSSQ) may include: preparing a silane compound; preparing a carbon dioxide solvent; injecting the silane compound into a reactor; increasing a pressure and temperature within the reactor, and changing a state of the carbon dioxide solvent into a liquid state or a supercritical state by injecting the carbon dioxide solvent into the reactor; supplying water and a catalyst to the reactor; inducing hydrolysis and a condensation reaction by increasing the temperature within the reactor; precipitating a polysilsesquioxane (PSSQ) product substituted with a functional group by controlling the temperature and pressure within the reactor; and separating the silane compound of an unreacted material within the reactor from the polysilsesquioxane (PSSQ) of product.

The silane compound may be represented by $RSiZ_3$ (R is an organic substituent and corresponds to hydrogen, a substituted or unsubstituted aliphatic hydrocarbon group having 1 to 30 carbon atoms, a substituted or unsubstituted aromatic hydrocarbon group having 1 to 30 carbon atoms, a substituted or unsubstituted alicyclic hydrocarbon group having 1 to 30 carbon atoms, a substituted or unsubstituted silyl group having 1 to 30 carbon atoms, a substituted or unsubstituted allyl group having 1 to 30 carbon atoms, a substituted or unsubstituted acyl group having 1 to 30 carbon atoms, a substituted or unsubstituted vinyl group having 1 to 30 carbon atoms, a substituted or unsubstituted amine group having 1 to 30 carbon atoms, a substituted or unsubstituted acetate having 1 to 30 carbon atoms, or alkali metal, Z is a substituent which is hydrolyzed and corresponds to Cl, Br, I or alkoxy group). The polysilsesquioxane (PSSQ) manufactured by the present invention may include a compound of the following chemical formula (1) as a monomer. However, there is no limit to this. The polysilsesquioxane (PSSQ) with a completely condensed cage structure, an open cage structure, etc., may be included.

Chemical formula (1)

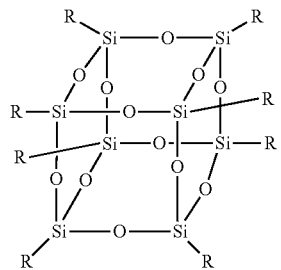

The step of increasing the pressure and temperature within the reactor, and changing the state of the carbon dioxide solvent into the liquid state or the supercritical state by injecting the carbon dioxide solvent into the reactor may be performed at a temperature of 30 to 80° C. and at a pressure of 1,000 to 5,000 psi. Also, preferably, the step can be performed at a temperature of 35° C. and at a pressure of 2,000 psi.

The supercritical carbon dioxide solvent of the present invention may be in the supercritical state. The carbon dioxide solvent may include a semi-supercritical fluid which can be treated almost the same as the supercritical fluid because the semi-supercritical fluid is in a state where the temperature and pressure are slightly lower than the critical temperature and the critical pressure, or because the state transition and state change of the semi-supercritical fluid occur for a very short time.

In the step of supplying the water and catalyst to the reactor, at least one of an acid catalyst and a base catalyst is selected as the catalyst. More specifically, the acid catalyst may include at least one of hydrochloric acid, sulfuric acid, nitric acid, acetic acid, phosphoric acid, phosphoric ester, activated clay, iron chloride, boric acid, trifluoro acetic acid, trifluoro methane sulfonic acid, and p-toluenesulfonic acid, and the base catalyst may include at least one of hydroxide of alkali metal or alkali earth metal, alkoxide of alkali metal or alkali earth metal, tetra alkyl ammonium hydroxide, and amine compounds. However, it is clear that the base catalyst is not limited to this.

In the step of inducing the hydrolysis and condensation reaction by increasing the temperature within the reactor, it is preferable that the temperature within the reactor is increased to 30 to 80° C. and the reaction is performed for 18 to 30 hours. More preferably, it is possible to perform the reaction for 24 hours at a temperature of 45° C.

According to a method using a liquid organic solvent, since the condensation reaction of the reactant is performed within a temperature range of 60 to 140° C., there are problems that it is difficult to efficiently progress the reaction under the temperature of 60° C. and reversely to inhibit the gelation above the temperature of 140° C. Therefore, the condensation reaction temperature has been required to be maintained at 60 to 140° C. On the contrary, in the method according to the present invention, since the condensation reaction is performed in the liquid or supercritical carbon dioxide solvent, it is preferable to maintain the reaction temperature between 40 and 60° C., and there is an advantage of progressing the reaction under much milder conditions.

In the step of inducing the hydrolysis and condensation reaction by increasing the temperature within the reactor, after the water and catalyst are supplied, the temperature of the reactor is increased, so that it is possible that a solubility within the carbon dioxide of the silane compound is increased and reaction of the product in the liquid or supercritical carbon dioxide is also promoted.

In the step of precipitating a polysilsesquioxane (PSSQ) product substituted with a functional group by controlling the temperature and pressure within the reactor, the temperature is controlled to less than 45° C. and the pressure is controlled to be less 1,700 psi, so that it is possible that the polysilsesquioxane (PSSQ) of the product is precipitated and the silane compound of the unreacted material remains dissolved in the carbon dioxide solvent. As such, in the method for manufacturing the polysilsesquioxane according to the present invention, it is possible to selectively separate the polysilsesquioxane of the product from the silane compound of the unreacted material by making use of the fact that the polysilsesquioxane of the product is not dissolved in the liquid or supercritical carbon dioxide solvent at a temperature lower than 45 and at a pressure lower than 1,700 psi, and the silane compound of the unreacted material is dissolved in the liquid or supercritical carbon dioxide solvent at a temperature lower than 45 and at a pressure lower than 1,700 psi.

Therefore, since the polysilsesquioxane is generally a viscous liquid or solid, the polysilsesquioxane of the product is precipitated as a precipitate on the bottom of the reactor. Since the unreacted material is dissolved in the carbon dioxide solvent, the product and the unreacted material can be separated from each other without another separation process.

Also, if the carbon dioxide solvent is changed into a gas state, the carbon dioxide solvent penetrates the product, so that it is preferable to control the temperature and pressure within a range in which the carbon dioxide solvent having a temperature of 45 and a pressure of 1,700 psi is not changed into the gas state.

In the step of separating the silane compound of the unreacted material within the reactor from the polysilsesquioxane (PSSQ) of the product, the silane compound of the unreacted material, which has been melted in an upper portion of the reactor, can be removed by flowing the liquid carbon dioxide to the reactor. The liquid carbon dioxide satisfies preferably a condition of 1,500 psi at a temperature of 25° C. However, there is no limit to this. As such, the unreacted material can be completely removed by flowing the liquid carbon dioxide solvent.

Figure 2:
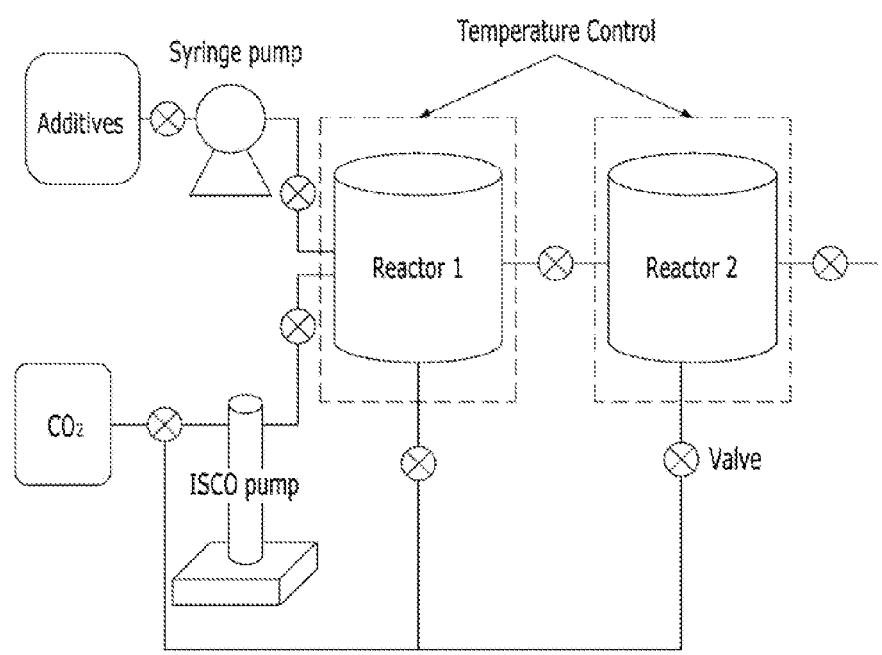
FIG. 2 is a schematic view of a process of a reactor used to manufacture the polysilsesquioxane according to an embodiment of the present invention.

Next, when the reaction shown in FIG. 2 is used, the method for manufacturing the polysilsesquioxane may further include controlling the pressure to a normal pressure by opening a valve connected to the outside of the reactor, discharging the carbon dioxide in the form of gas, which remains in a vessel, and obtaining the polysilsesquioxane (PSSQ) of the product precipitated on the bottom of the reactor. When the pressure within the reactor is controlled to a normal pressure by opening the valve, the carbon dioxide which remains within the reactor is discharged in the form of a gas, so that the high-purity final material from which the solvent has been completely removed can be collected.

The silane compound used in the present invention may correspond to at least any one selected from the group consisting of (3-Chloropropyl)trimethoxysilane, (3-bromopropyl)trimethoxysilane, (3-Iodopropyl)trimethoxysilane, (3-Aminopropyl)trimethoxysilane, (3-Mercaptopropyl)trimethoxysilane, Trimethoxy [3-(methylamino)propyl] silane, Trimethoxy (7-octen-1-yl) silane, [3-(2-aminoethylamino) propyl]trimethoxysilane, N1-(3-trimethoxysilylpropyl) diethylene triamine, 3-(trimethoxysilyl) propyl methacrylate, (3-glycidyloxypropyl) trimethoxysilane, 3-(trimethoxysilyl) propyl acrylate, N-[3-(trimethoxysilyl) propyl]aniline, (3-chloropropyl) triethoxysilane, (3-aminopropyl) triethoxysilane, (3-Mercaptopropyl) trimethoxysilane, and (3-glycidyloxy-propyl) triethoxysilane.

More specifically, it is preferable that the silane compound may correspond to at least any one selected from the group consisting of Trimethoxy (propyl) silane, Isobutyl (trimethoxy)silane, Trimethoxy (octyl) silane, Hexadecyl trimethoxysilane, Trimethoxy (octadecyl) silane, [3-(diethylamino)propyl] trimethoxysilane, (N,N-dimethylaminopropyl) trimethoxysilane, Trimethoxy (3,3,3-trifluoropropyl) silane, Trimethoxy-(2-phenylethyl) silane, 1-[3-(trimethoxysilyl) propyl] urea, Trimethoxy [2-(7-oxabicyclo [4,1,0] hept-3-yl) ethyl] silane, n-propyltriethoxysilane, 3-(triethoxysilyl) propionitrile, Triethoxy (isobutyl) silane, Triethoxy Pentyl silane, Hexyl triethoxysilane, Triethoxy (octyl) silane, 3-cyano-propyltriethoxysilane, N-octadecyl triethoxysilane, cyclo pentyl trimethoxysilane, (Triethoxysilyl) cyclohexane, 3-[bis (2-hydroxyethyl) amino] propyl-triethoxysilane, 1H,1H,2H, 2H-Perfluorooctyl triethoxysilane, 1H,1H,2H,2H-Perfluorodecyl triethoxysilane, [3-[tri(ethoxy)silyl]propyl]urea or [3-[tri (methoxy) silyl] propyl] urea. However, it is clear that there is no limit to this.

The Polysilsesquioxane (PSSQ) may be manufactured according to the present invention such that such that a ratio of a completely condensed cage structure to an open cage structure is 1:0.5 to 1:2. The structure of the Polysilsesquioxane manufactured according to the kind and amount of the silane compound to be used and the kind and amount of the catalyst to be used can be controlled. In general, the longer the reaction time is and the higher the reaction temperature is, the completely condensed cage structure may be more yielded.

Also, there are many available variables for controlling the purity, selectivity, rate, and mechanism of the chemical manufacturing method. In the present invention, particularly, the liquid or supercritical carbon dioxide solvent is used as a solvent, and it is possible to control the solubility of the reactant, product, and unreacted material by controlling the temperature and pressure of the carbon dioxide solvent. Through such a method, it is possible to easily remove unreacted materials and to obtain the high-purity and high yield polysilsesquioxane.

MODE FOR INVENTION

Embodiment 1

Embodiment 1 relates to a method for manufacturing the polysilsesquioxane (PSSQ) by adopting a methacrylate functional group using an acetic acid catalyst and 3-(Trimethoxysilyl)propyl methacrylate. 6 g of 3-(Trimethoxysilyl)propyl methacrylate, 2.94 g of water, 2 ml of acetic acid and a magnetic bar are supplied to a 30 mL high-pressure reactor.

After supercritical carbon dioxide having a temperature of 70° C. and a pressure of 4,000 psi is injected into the inside of the reactor, the reaction is progressed by starting stirring. After 24 hours, the reaction is terminated by reducing the temperature and pressure of the reactor to 25° C. and 2,000 psi (Pound per Square Inch), and water in the lower portion is separated and discharged by opening the valve.

In order to remove the catalyst and byproducts which may remain, the liquid carbon dioxide having a pressure of 1,500 psi and a temperature of 20° C. is flown at a speed of 20 mL/min or is precipitated within 50 mL of excess diethyl ether.

Figure 3A:
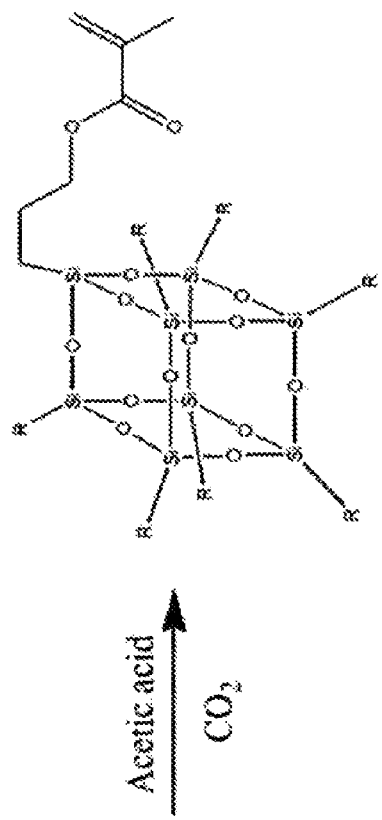
FIG. 3a shows a reaction scheme of the manufacture of the polysilsesquioxane according to an embodiment of the present invention.
Figure 3A:
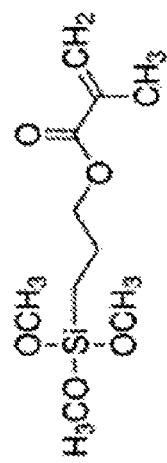

The reaction schemes of the reactant and product are shown in FIG. 3a. The product is colorless, transparent, viscous liquid. After the product is collected and dried in a vacuum at a normal temperature, it has been found that the reaction yield calculated by measuring the weight of the product is 84.4%.

Figure 3B:
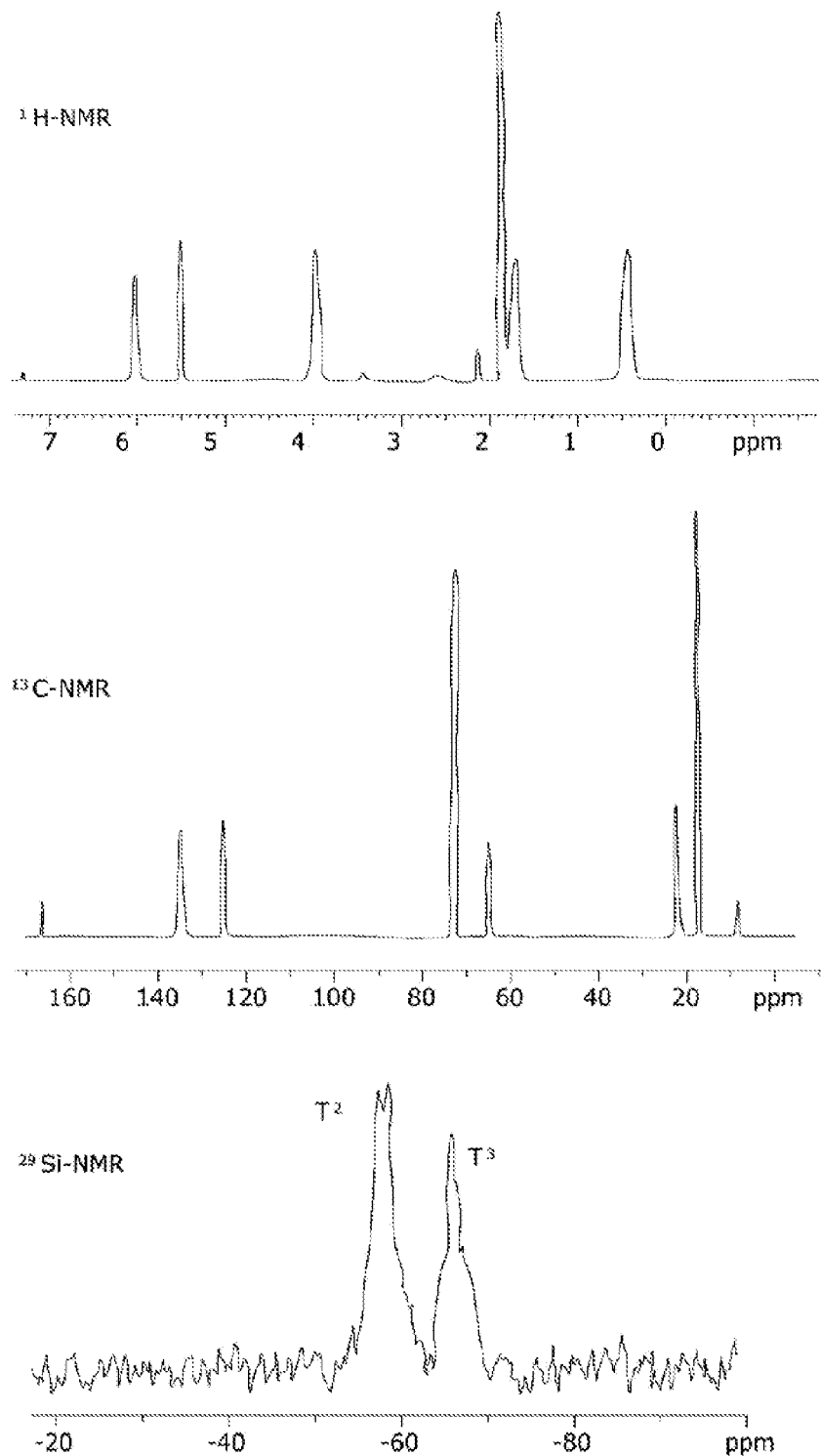
FIG. 3b shows 1H-nuclear magnetic resonance (NMR), 13C-NMR, and 29Si-NMR of the polysilsesquioxane according to an embodiment of the present invention.

Also, 1H-nuclear magnetic resonance (NMR), 13C-NMR and 29Si-NMR of the product have been carried out. The results of these are found in FIG. 3b. In particular, in the result of 29Si-NMR, both the polysilsesquioxane with a completely condensed cage structure and the polysilsesquioxane with an open cage structure have been produced. It has been found that the production rate of the completely condensed cage structure is slightly higher than that of the open cage structure.

Embodiment 2

Embodiment 2 relates to a method for manufacturing the polysilsesquioxane (PSSQ) by adopting a thiol functional group using the acetic acid catalyst and (3-Mercaptopropyl)trimethoxysilane. 6 g of (3-Mercaptopropyl)trimethoxysilane, 0.7 g of water, 2 ml of acetic acid and the magnetic bar are supplied to the 30 mL high-pressure reactor.

After the carbon dioxide having a temperature of 70° C. and a pressure of 3,500 psi is injected into the inside of the reactor, the reaction is progressed by starting stirring. After 24 hours, the reaction is terminated by reducing the temperature and pressure of the reactor to 25° C. and 1,500 psi.

Figure 4A:
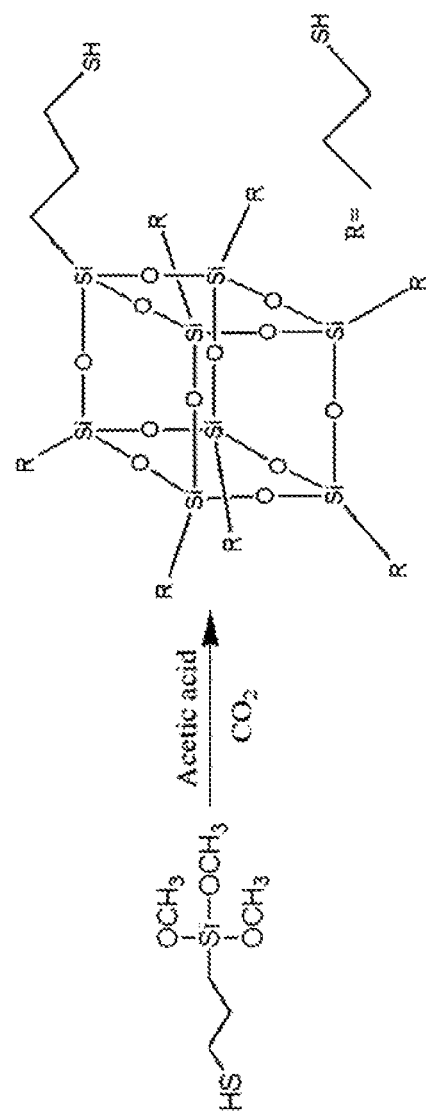
FIG. 4a shows a reaction scheme of the manufacture of the polysilsesquioxane according to an embodiment of the present invention.

The reaction schemes of the reactant and product are shown in FIG. 4a.

In order to remove the unreacted material and byproducts, the liquid carbon dioxide having a pressure of 1,500 psi and a temperature of 20° C. is flown at a speed of 20 mL/min.

After the carbon dioxide is slowly removed, the product is decanted by using hexane and is filtered. As a result, a white solid is obtained and dried in a vacuum. It has been found that the yield is 90.2%.

Figure 4B:
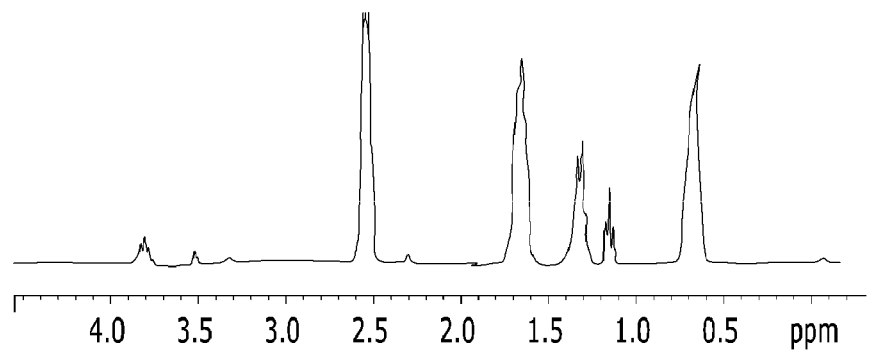
FIG. 4b shows 1H-nuclear magnetic resonance (NMR) and 13C-NMR of the polysilsesquioxane according to an embodiment of the present invention.
Figure 4B:
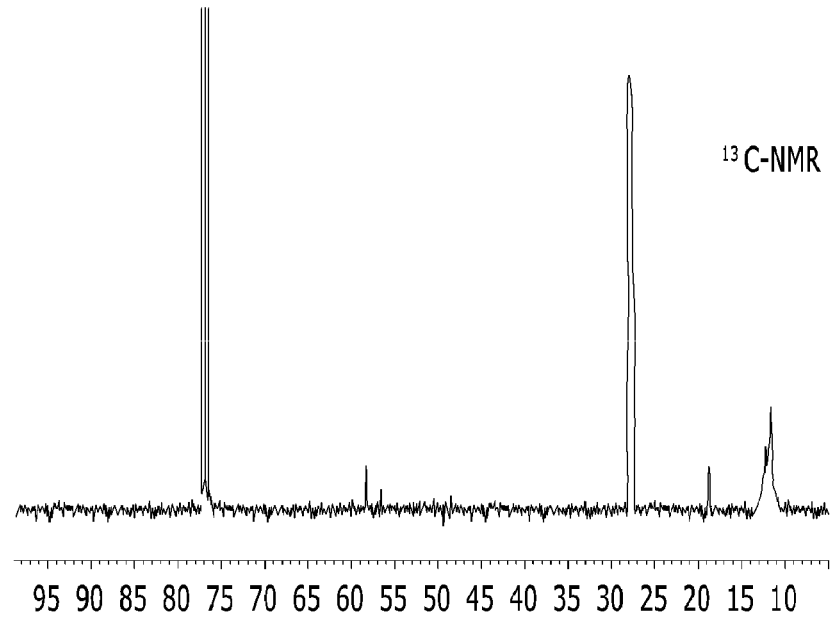

The 1H-NMR and 13C-NMR of the product have been carried out. The results of these are found in FIG. 4b.

Embodiment 3

Embodiment 3 relates to a method for manufacturing the polysilsesquioxane (PSSQ) by adopting a chloropropyl functional group using the acetic acid catalyst and (3-Aminopropyl)trimethoxysilane. 5 g of (3-Aminopropyl)trimethoxysilane, 0.8 g of water, 2 ml of acetic acid and the magnetic bar are supplied to the 30 mL high-pressure reactor.

After the carbon dioxide having a temperature of 70° C. and a pressure of 4,000 psi is injected into the inside of the reactor, the reaction is progressed by starting stirring.

After 24 hours, the reaction is terminated by reducing the temperature and pressure of the reactor to 25° C. and 2,000 psi.

Figure 5A:
FIG. 5a shows a reaction scheme of the manufacture of the polysilsesquioxane according to an embodiment of the present invention.
Figure 5A:
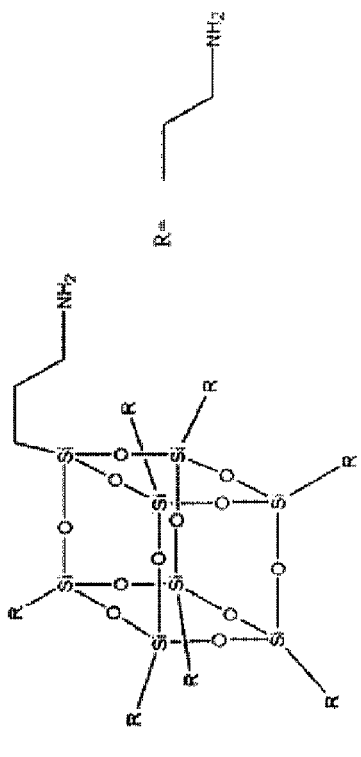
Figure 5A:
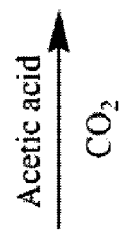
Figure 5A:
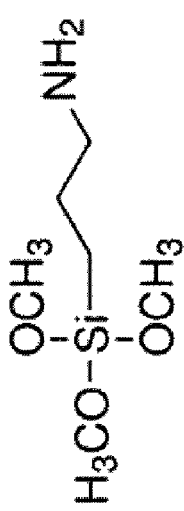

The reaction schemes of the reactant and product are shown in FIG. 5a.

In order to remove the unreacted material and byproducts, the liquid carbon dioxide having a pressure of 1,500 psi and a temperature of 20° C. is flown at a speed of 20 mL/min.

After the carbon dioxide is slowly removed, a white precipitated product is decanted by using 30 mL of diethyl ether, and is filtered.

Figure 5B:
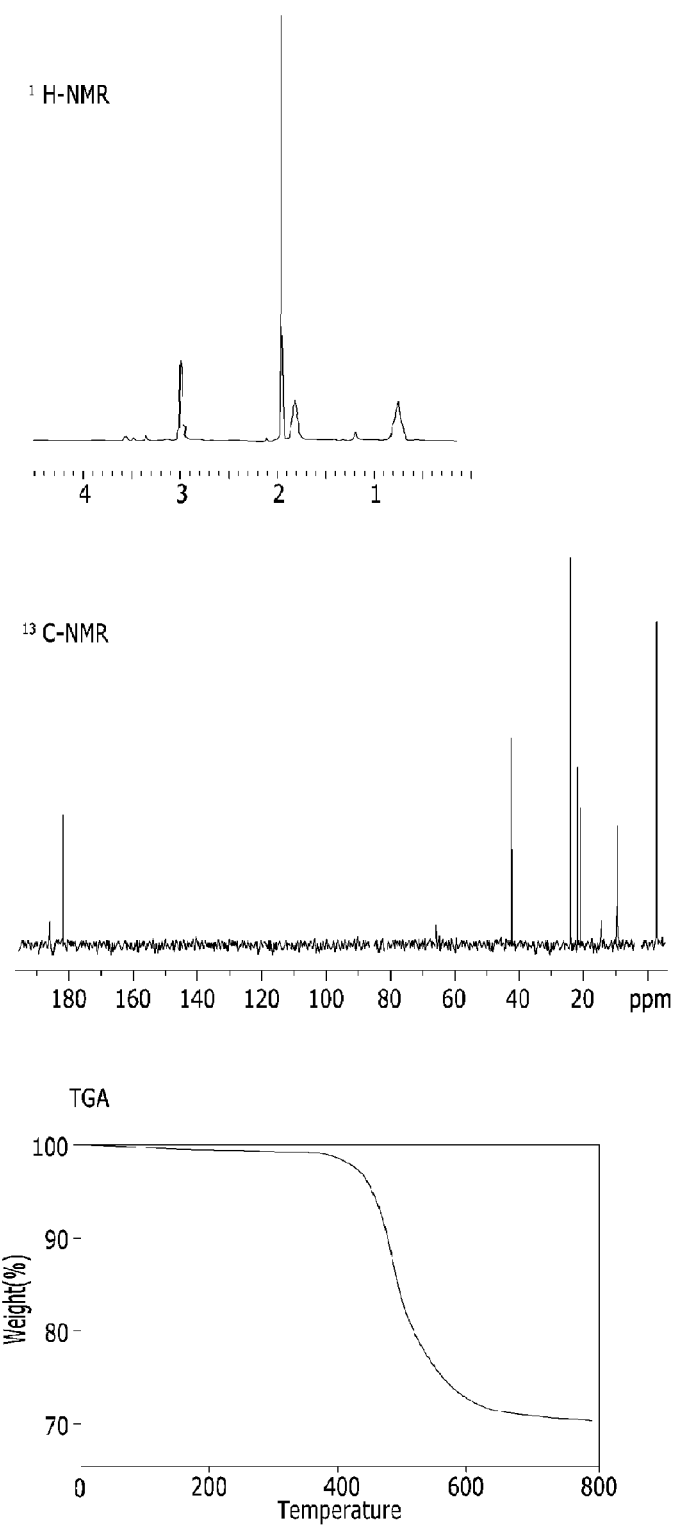
FIG. 5b shows 1H-nuclear magnetic resonance (NMR), 13C-NMR, and thermogravimetry analysis (TGA) of the polysilsesquioxane according to an embodiment of the present invention.

The filtered white powder is dried in a vacuum at a normal temperature. It has been found that the yield is 88.1%. The product is melted in $D_2O$, and the 1H-NMR, 13C-NMR and thermogravimetry analysis (TGA) have been performed. The results of these are found in FIG. 5b.

Embodiment 4

Embodiment 4 relates to a method for manufacturing the polysilsesquioxane (PSSQ) by adopting a hexyl epoxy functional group using the acetic acid catalyst and (3-Aminopropyl)trimethoxysilane. 4.56 g of (3-Aminopropyl)trimethoxysilane, 0.5 g of water, 2 ml of acetic acid and the magnetic bar are supplied to the 30 mL high-pressure reactor.

After the carbon dioxide having a temperature of 35° C. and a pressure of 3,000 psi is injected into the inside of the reactor, the reaction is progressed by starting stirring.

After 24 hours, the reaction is terminated by reducing the temperature and pressure of the reactor to 25° C. and 2,000 psi.

Figure 6A:
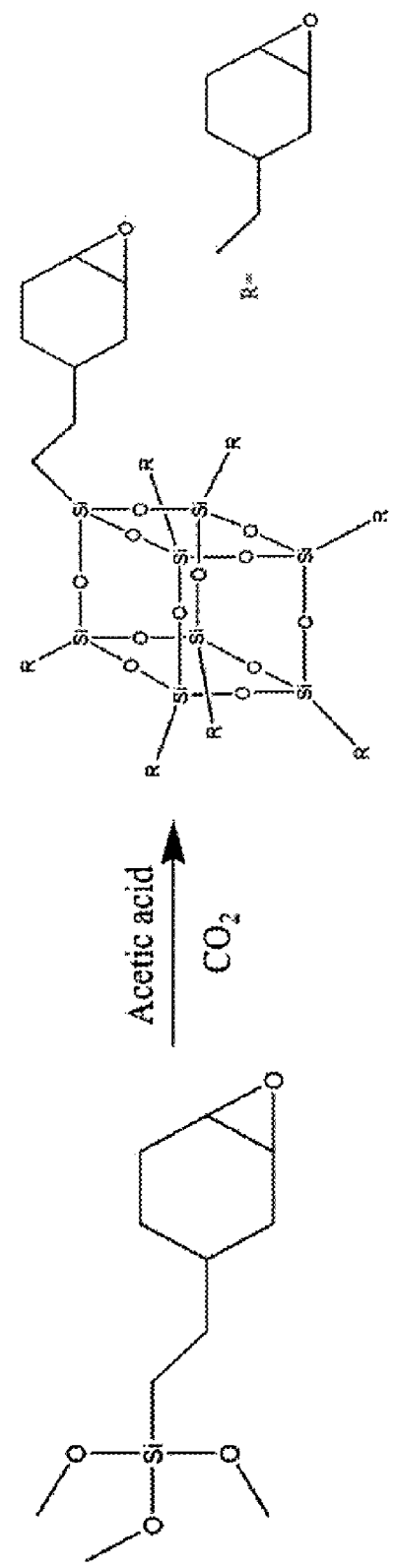
FIG. 6a shows a reaction scheme of the manufacture of the polysilsesquioxane according to an embodiment of the present invention.

The reaction schemes of the reactant and product are shown in FIG. 6a.

In order to remove the unreacted material and byproducts, the liquid carbon dioxide having a pressure of 1,500 psi and a temperature of 20° C. is flown at a speed of 20 mL/min.

After the carbon dioxide is slowly removed, the product is decanted by using the diethyl ether, and is filtered.

A light yellow solid having some viscosity is obtained and is dried in a vacuum. As a result of measurement of it, it has been found that the high yield is 85.8%.

Figure 6B:
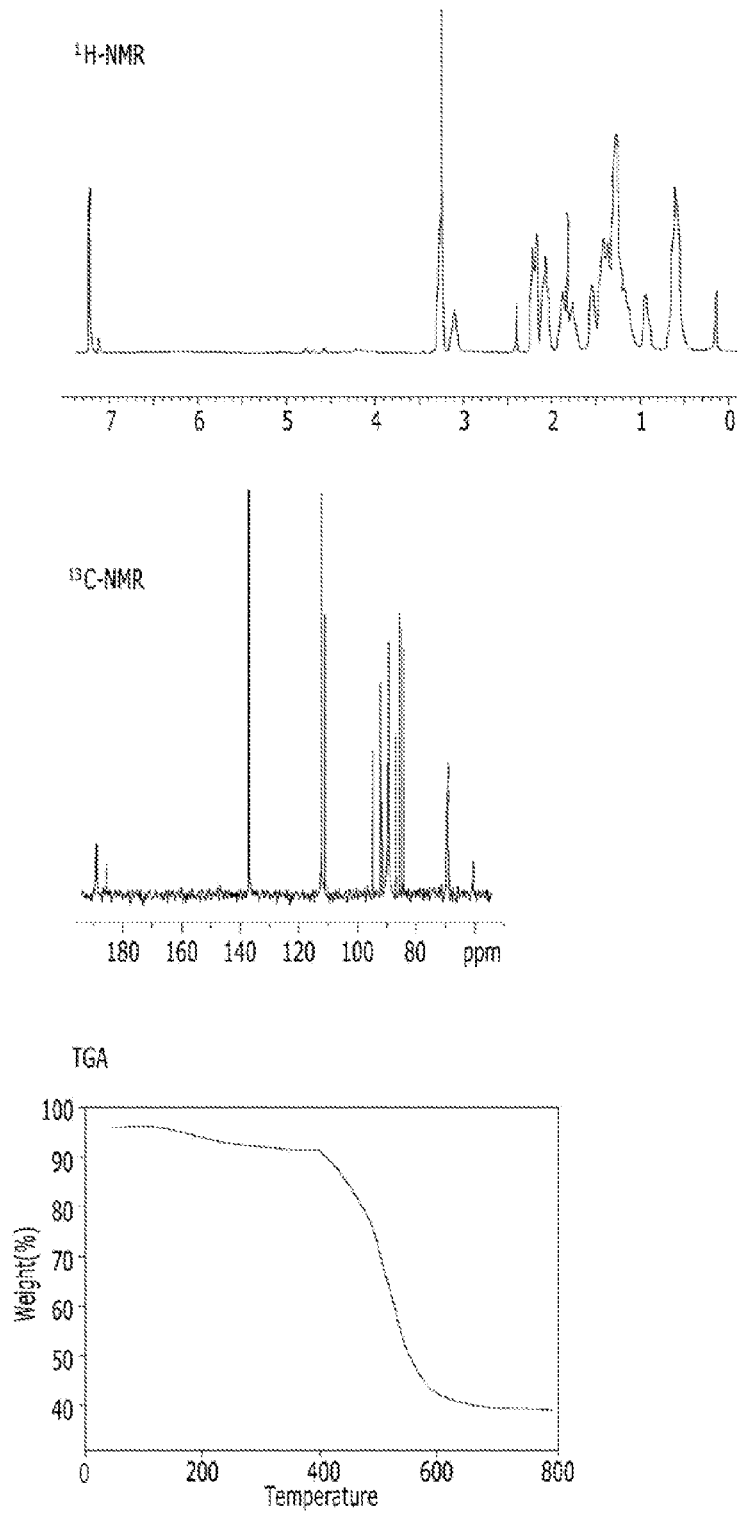
FIG. 6b shows 1H-nuclear magnetic resonance (NMR), 13C-NMR, and thermogravimetry analysis (TGA) of the polysilsesquioxane according to an embodiment of the present invention.

The product is melted in $CDCl_3$, and the 1H-NMR, 13C-NMR and TGA have been performed. The results of these are found in FIG. 6b.

Embodiment 5

Embodiment 5 relates to a method for manufacturing the polysilsesquioxane (PSSQ) by adopting the methacrylate functional group using a HCL acid catalyst and 3-(Trimethoxysilyl)propyl methacrylate. 6 g of 3-(Trimethoxysilyl)propyl methacrylate, and 1.96 g of water are supplied to the 30 mL high-pressure reactor, and then the reactor is closed.

The carbon dioxide is injected into the inside of the reactor at a temperature of 60° C. and at a pressure of 1,500 psi by using an ISCO pump.

1 mL of HCl aqueous solution (33.5%) is injected at a pressure of 3,500 psi into the inside of the reactor into which the carbon dioxide has been injected.

After all the reactive materials are injected, the reaction is progressed by stirring them for 24 hours. Then, the reaction is terminated by reducing the temperature and pressure of the reactor to 25° C. and 2,000 psi, and water in the lower portion is separated and discharged by opening the valve.

Figure 7A:
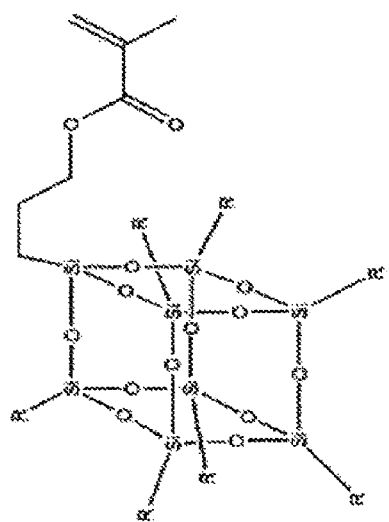
FIG. 7a shows a reaction scheme of the manufacture of the polysilsesquioxane according to an embodiment of the present invention.
Figure 7A:
Figure 7A:
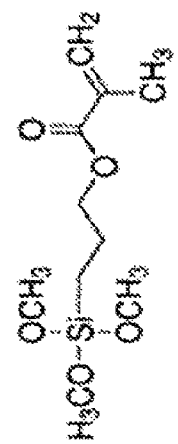

The reaction schemes of the reactant and product are shown in FIG. 7a.

In order to remove the HCl, unreacted material and byproducts, the liquid carbon dioxide having a pressure of 1,500 psi and a temperature of 20° C. is flown at a speed of 20 mL/min.

Figure 7B:
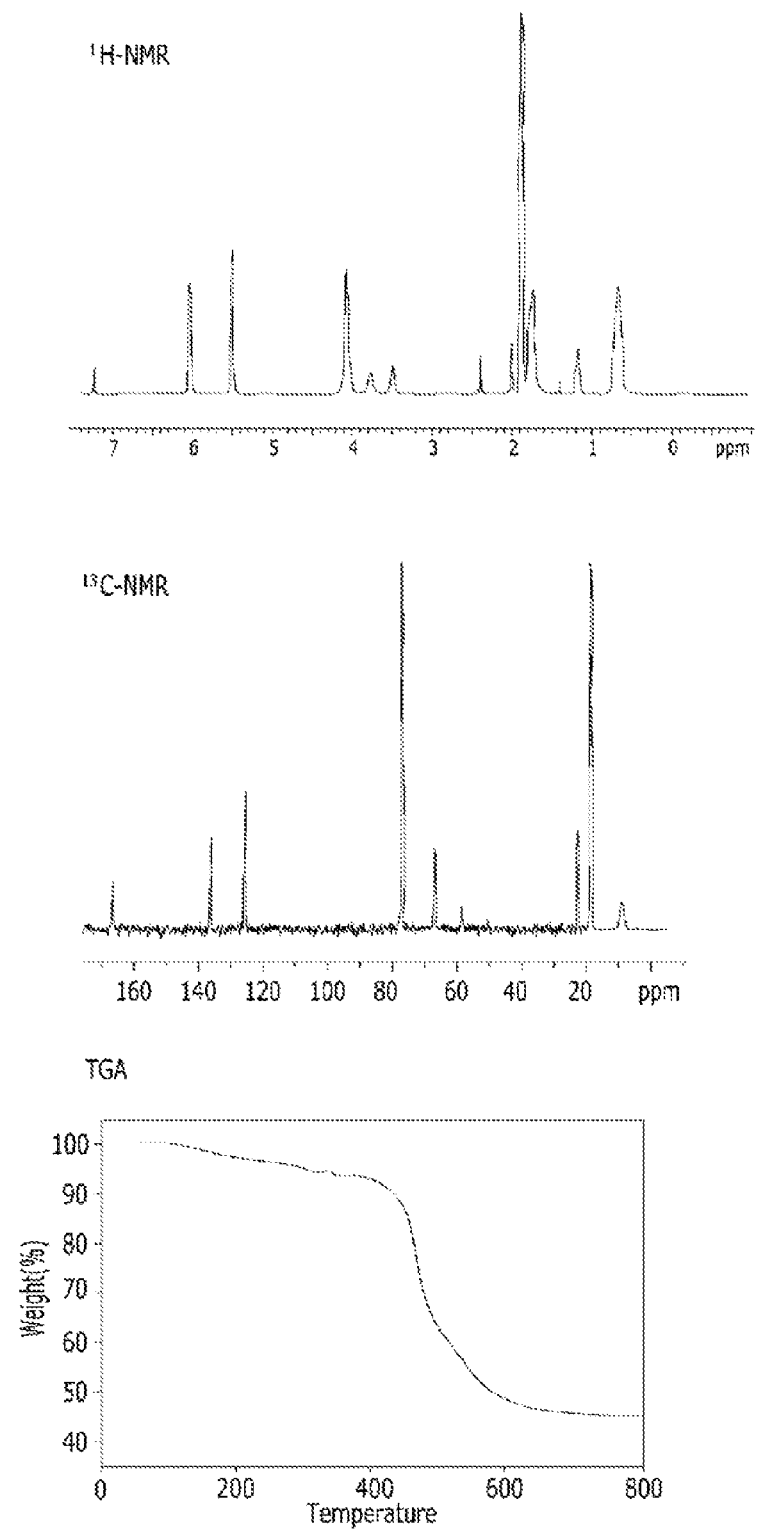
FIG. 7b shows 1H-nuclear magnetic resonance (NMR), 13C-NMR, and thermogravimetry analysis (TGA) of the polysilsesquioxane according to an embodiment of the present invention.

The product has been collected through the removal of the carbon dioxide. It has been found that the yield calculated by measuring the weight of the product is 86.6%. The 1H-NMR, 13C-NMR and TGA of the product have been performed. The results of these are found in FIG. 7b.

Embodiment 6

Embodiment 6 relates to a method for manufacturing the polysilsesquioxane (PSSQ) by adopting the chloropropyl functional group using the acetic acid catalyst and (3-Chloropropyl)trimethoxysilane. 5 g of (3-Chloropropyl) trimethoxysilane, 0.7 g of water, 2 ml of acetic acid and the magnetic bar are supplied to the 30 mL high-pressure reactor. After the carbon dioxide having a temperature of 70° C. and a pressure of 2,500 psi is injected into the inside of the reactor, the reaction is progressed by starting stirring. After 24 hours, the reaction is terminated by reducing the temperature and pressure of the reactor to 25° C. and 1,500 psi.

The reactant and product are shown in the following reaction scheme 1.

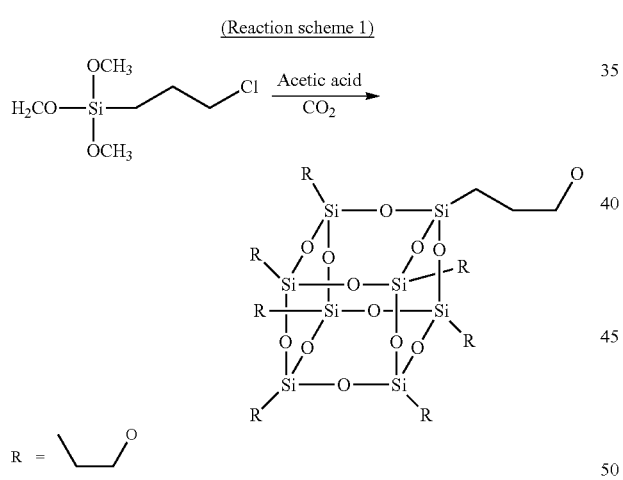

In order to remove the unreacted material and byproducts, the liquid carbon dioxide having a pressure of 1,500 psi and a temperature of 20° C. is flown at a speed of 20 mL/min. After the carbon dioxide is slowly removed, the product is decanted by using hexane and is filtered. As a result, a white solid is obtained and dried in a vacuum. It has been found that the yield is 87%.

Embodiment 7

Embodiment 7 relates to a method for manufacturing the polysilsesquioxane (PSSQ) by adopting an Isobutyl functional group using the acetic acid catalyst and Isobutyl (trimethoxy)silane. 6 g of Isobutyl(trimethoxy)silane, 0.95 g of water, 2 ml of acetic acid and the magnetic bar are supplied to the 30 mL high-pressure reactor. After the carbon dioxide having a temperature of 70° C. and a pressure of 3,500 psi is injected into the inside of the reactor, the reaction is progressed by starting stirring. After 24 hours, the reaction is terminated by reducing the temperature and pressure of the reactor to 25° C. and 1,500 psi.

The reactant and product are shown in the following reaction scheme 2.

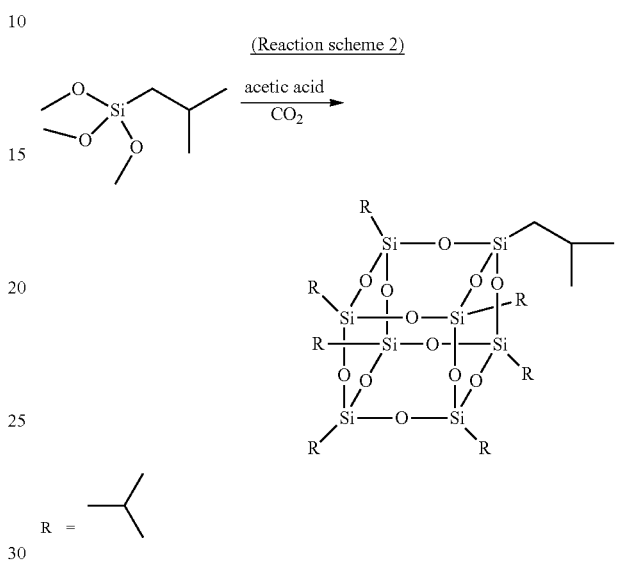

In order to remove the unreacted material and byproducts, the liquid carbon dioxide having a pressure of 1,500 psi and a temperature of 20° C. is flown at a speed of 20 mL/min. After the carbon dioxide is slowly removed, the product is decanted by using hexane and is filtered. As a result, a white solid is obtained and dried in a vacuum. It has been found that the yield is 93.2%.

Embodiment 8

Embodiment 8 relates to a method for manufacturing the polysilsesquioxane (PSSQ) by adopting a cyclohexane functional group using the acetic acid catalyst and (Triethoxysilyl)cyclohexane. 8 g of (Triethoxysilyl)cyclohexane, 0.9 g of water, 2 ml of acetic acid and the magnetic bar are supplied to the 30 mL high-pressure reactor. After the carbon dioxide having a temperature of 60° C. and a pressure of 3,000 psi is injected into the inside of the reactor, the reaction is progressed by starting stirring. After 24 hours, the reaction is terminated by reducing the temperature and pressure of the reactor to 25° C. and 1,500 psi.

The reactant and product are shown in the following reaction scheme 3.

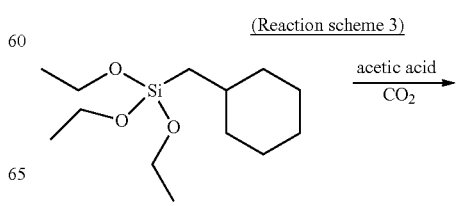

-continued

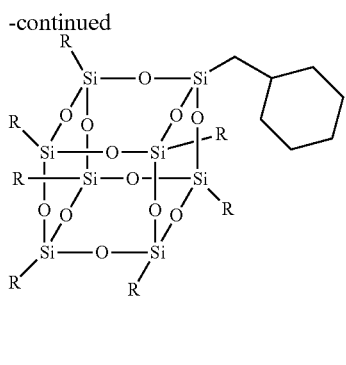

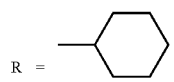

In order to remove the unreacted material and byproducts, the liquid carbon dioxide having a pressure of 1,500 psi and a temperature of 20° C. is flown at a speed of 20 mL/min. After the carbon dioxide is slowly removed, the product is decanted by using hexane and is filtered. As a result, a white solid is obtained and dried in a vacuum. It has been found that the yield is 87.2%.

Embodiment 9

Embodiment 9 relates to a method for manufacturing the polysilsesquioxane (PSSQ) by adopting a 2-phenylethyl functional group using the acetic acid catalyst and Trimethoxy(2-phenylethyl)silane. 10 g of Trimethoxy(2-phenylethyl)silane, 1.2 g of water, 2 ml of acetic acid and the magnetic bar are supplied to the 30 mL high-pressure reactor. After the carbon dioxide having a temperature of 70° C. and a pressure of 3,500 psi is injected into the inside of the reactor, the reaction is progressed by starting stirring. After 24 hours, the reaction is terminated by reducing the temperature and pressure of the reactor to 25° C. and 1,500 psi.

The reactant and product are shown in the following reaction scheme 4.

(Reaction scheme 4)

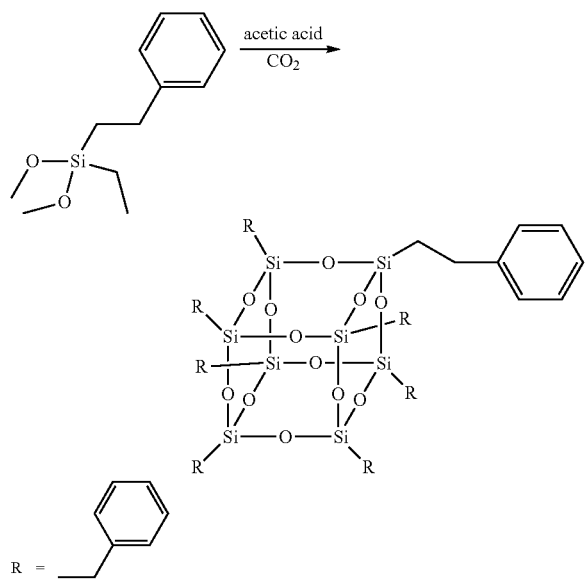

In order to remove the unreacted material and byproducts, the liquid carbon dioxide having a pressure of 1,500 psi and a temperature of 20° C. is flown at a speed of 20 mL/min. After the carbon dioxide is slowly removed, the product is decanted by using hexane and is filtered. As a result, a white solid is obtained and dried in a vacuum. It has been found that the yield is 88%.

Embodiment 10

Embodiment 10 relates to a method for manufacturing the polysilsesquioxane (PSSQ) by adopting the Isobutyl functional group using the HCl catalyst and Isobutyl(trimethoxy)silane. 6 g of Isobutyl(trimethoxy)silane, 0.65 g of water, and the magnetic bar are supplied to the 30 mL high-pressure reactor. The carbon dioxide having a temperature of 70° C. and a pressure of 3,000 psi is injected into the inside of the reactor, While strongly stirring the magnetic bar, the reaction is progressed by injecting 1 ml of HCl (37% in $H_2O$) into the carbon dioxide having a temperature of 70° C. and a pressure of 4,000 psi. After 24 hours, the reaction is terminated by reducing the temperature and pressure of the reactor to 25° C. and 1,500 psi.

The reactant and product are shown in the following reaction scheme 5.

(Reaction scheme 5)

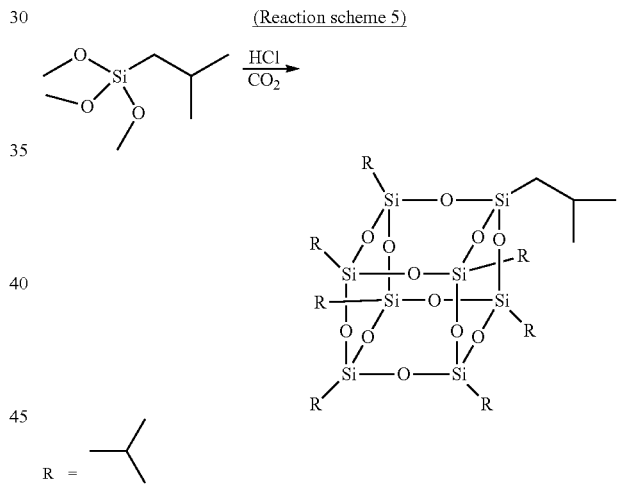

In order to remove the unreacted material and byproducts, the liquid carbon dioxide having a pressure of 1,500 psi and a temperature of 20° C. is flown at a speed of 20 mL/min. After the carbon dioxide is slowly removed, the product is decanted by using hexane and is filtered. As a result, a white solid is obtained and dried in a vacuum. It has been found that the yield is 92.2%.

Embodiment 11

Embodiment 11 relates to a method for manufacturing the polysilsesquioxane (PSSQ) by adopting the 2-phenylethyl functional group using the HCl catalyst and Trimethoxy(2-phenylethyl)silane. 10 g of Trimethoxy(2-phenylethyl)silane, 0.9 g of water, and the magnetic bar are supplied to the 30 mL high-pressure reactor. The carbon dioxide having a temperature of 70° C. and a pressure of 3,000 psi is injected into the inside of the reactor.

While strongly stirring the magnetic bar, the reaction is progressed by injecting 1 ml of HCl (37% in $H_2O$) into the carbon dioxide having a temperature of 70° C. and a pressure of 4,000 psi. After 24 hours, the reaction is terminated by reducing the temperature and pressure of the reactor to 25° C. and 1,500 psi.

The reactant and product are shown in the following reaction scheme 6.

(Reaction scheme 6)

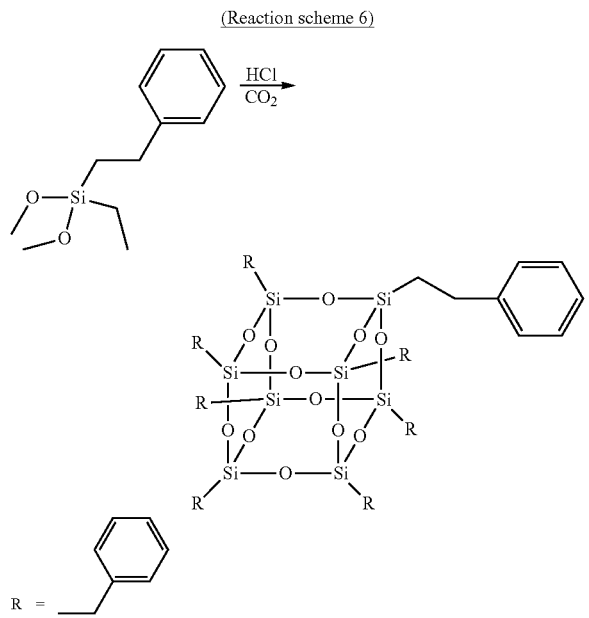

In order to remove the unreacted material and byproducts, the liquid carbon dioxide having a pressure of 1,500 psi and a temperature of 20° C. is flown at a speed of 20 mL/min.

After the carbon dioxide is slowly removed, the product is decanted by using hexane and is filtered. As a result, a white solid is obtained and dried in a vacuum. It has been found that the yield is 91%.

Embodiment 12

Embodiment 12 relates to a method for manufacturing the polysilsesquioxane (PSSQ) by using Trichloro(propyl)silane. 6 g of Trichloro(propyl)silane and the magnetic bar are supplied to the 30 mL high-pressure reactor. Then, the reactor is closed and the carbon dioxide having a temperature of 35° C. and a pressure of 2,000 psi is injected into the inside of the reactor. While strongly stirring the magnetic bar, the reaction is progressed by injecting 1 g of water into the inside of the reactor by using the carbon dioxide having a temperature of 35° C. and a pressure of 3,000 psi.

A white precipitate is produced during the reaction, and the reaction lasts for 24 hours. The reaction is terminated by reducing the temperature and pressure of the reactor to 25° C. and 1,500 psi.

The reactant and product are shown in the following reaction scheme 7.

(Reaction scheme 7)

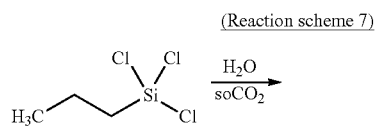

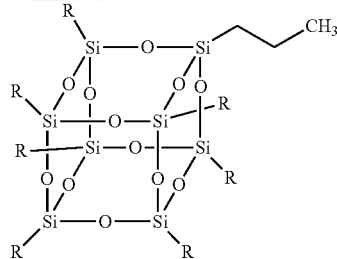

In order to remove the unreacted material and byproducts, the liquid carbon dioxide having the same temperature and pressure is flown at a speed of 20 mL/min. After the carbon dioxide is slowly removed, the produced white solid is dried in a vacuum. It has been found that the yield is 95%.

Embodiment 13

Embodiment 13 relates to a method for manufacturing the polysilsesquioxane (PSSQ) by using 3-Cyanopropyltrichlorosilane. 5.5 g of 3-Cyanopropyltrichlorosilane and the magnetic bar are supplied to the 30 mL high-pressure reactor. Then, the reactor is closed and the carbon dioxide having a temperature of 50° C. and a pressure of 2,000 psi is injected into the inside of the reactor.

While strongly stirring the magnetic bar, the reaction is progressed by injecting 0.83 g of water into the inside of the reactor by using the carbon dioxide having a temperature of 50° C. and a pressure of 3,000 psi.

A white precipitate is produced during the reaction, and the reaction lasts for 24 hours. The reaction is terminated by reducing the temperature and pressure of the reactor to 25° C. and 1,500 psi.

The reactant and product are shown in the following reaction scheme 8.

(Reaction scheme 8)

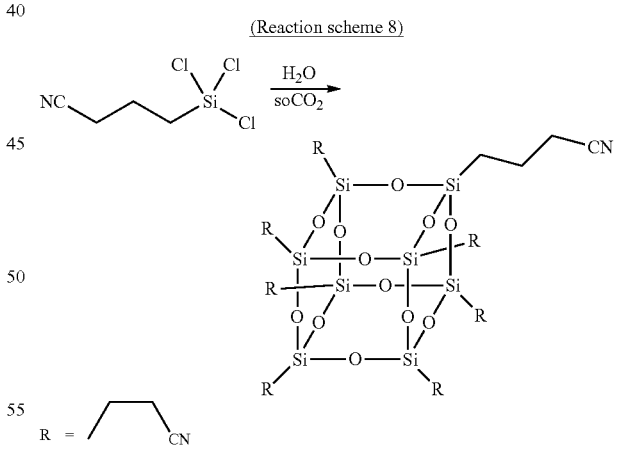

In order to remove the unreacted material and byproducts, the liquid carbon dioxide having the same temperature and pressure is flown at a speed of 20 mL/min. After the carbon dioxide is slowly removed, the produced white solid is dried in a vacuum. It has been found that the yield is 92%.

Embodiment 14

Embodiment 14 relates to a method for manufacturing the polysilsesquioxane (PSSQ) by using Octenyltrichlorosilane.

7 g of Octenyltrichlorosilane and the magnetic bar are supplied to the 30 mL high-pressure reactor. Then, the reactor is closed and the carbon dioxide having a temperature of 50° C. and a pressure of 2,000 psi is injected into the inside of the reactor. While strongly stirring the magnetic bar, the reaction is progressed by injecting 0.8 g of water into the inside of the reactor by using the carbon dioxide having a temperature of 50° C. and a pressure of 3,000 psi.

A white precipitate is produced during the reaction, and the reaction lasts for 24 hours. The reaction is terminated by reducing the temperature and pressure of the reactor to 25° C. and 1,500 psi. In order to remove the unreacted material and byproducts, the liquid carbon dioxide having the same temperature and pressure is flown at a speed of 20 mL/min. After the carbon dioxide is slowly removed, the produced white solid is dried in a vacuum. It has been found that the yield is 89.5%.

The reactant and product are shown in the following reaction scheme 9.

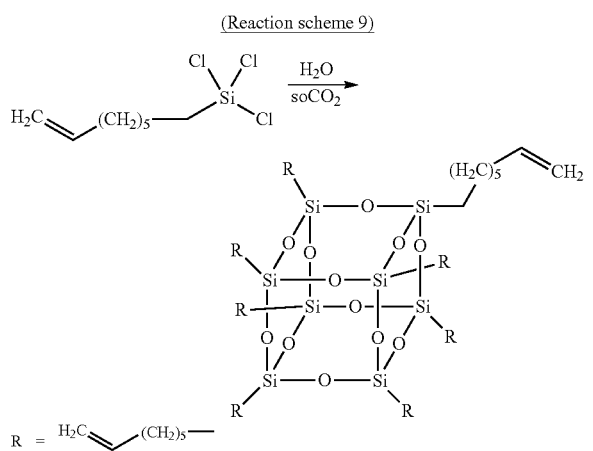

Embodiment 15

Embodiment 15 relates to a method for manufacturing the polysilsesquioxane (PSSQ) by using Trichlorocyclopentylsilane. 7 g of Trichlorocyclopentylsilane and the magnetic bar are supplied to the 30 mL high-pressure reactor. Then, the reactor is closed and the carbon dioxide having a temperature of 50° C. and a pressure of 2,000 psi is injected into the inside of the reactor.

While strongly stirring the magnetic bar, the reaction is progressed by injecting 1 g of water into the inside of the reactor by using the carbon dioxide having a temperature of 50° C. and a pressure of 3,000 psi. A white precipitate is produced during the reaction, and the reaction lasts for 24 hours.

The reaction is terminated by reducing the temperature and pressure of the reactor to 25° C. and 1,500 psi. In order to remove the unreacted material and byproducts, the liquid carbon dioxide having the same temperature and pressure is flown at a speed of 20 mL/min. After the carbon dioxide is slowly removed, the produced white solid is dried in a vacuum. It has been found that the yield is 91%.

The reactant and product are shown in the following reaction scheme 10.

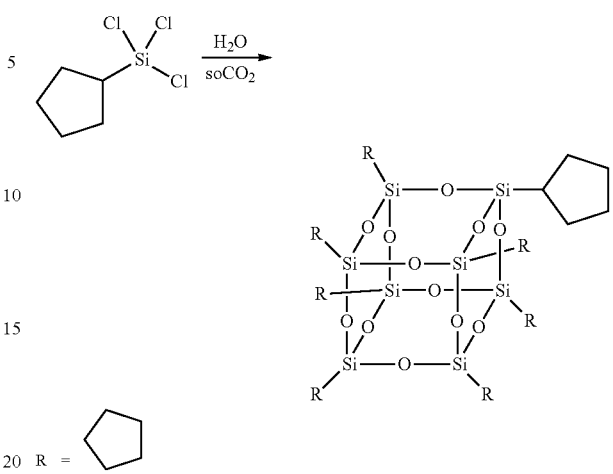

Embodiment 16

Embodiment 16 relates to a method for manufacturing the polysilsesquioxane (PSSQ) by using Trichloro(phenethyl) silane. 8 g of Trichloro(phenethyl)silane and the magnetic bar are supplied to the 30 mL high-pressure reactor. Then, the reactor is closed and the carbon dioxide having a temperature of 70° C. and a pressure of 3,000 psi is injected into the inside of the reactor. While strongly stirring the magnetic bar, the reaction is progressed by injecting 0.95 g of water into the inside of the reactor by using the carbon dioxide having a temperature of 70° C. and a pressure of 4,000 psi.

A white precipitate is produced during the reaction, and the reaction lasts for 24 hours. The reaction is terminated by reducing the temperature and pressure of the reactor to 25° C. and 1,500 psi. In order to remove the unreacted material and byproducts, the liquid carbon dioxide having the same temperature and pressure is flown at a speed of 20 mL/min. After the carbon dioxide is slowly removed, the produced white solid is dried in a vacuum. It has been found that the yield is 88.5%.

The reactant and product are shown in the following reaction scheme 11.

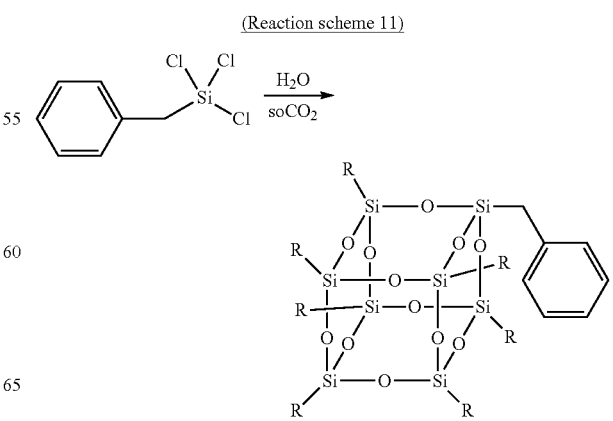

R = 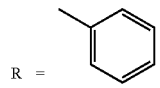

Embodiment 17

Embodiment 17 relates to a method for manufacturing the polysilsesquioxane (PSSQ) by adopting the thiol functional group using the acetic acid catalyst and the Isobutyl functional group. 3 g of (3-Mercaptopropyl)trimethoxysilane, 2.72 g of Isobutyl(trimethoxy)silane, 0.85 g of water, 2 ml of acetic acid, and the magnetic bar are supplied to the 30 mL high-pressure reactor.

After the carbon dioxide having a temperature of 70° C. and a pressure of 3,500 psi is injected into the inside of the reactor, the reaction is progressed by starting stirring. After 24 hours, the reaction is terminated by reducing the temperature and pressure of the reactor to 25° C. and 1,500 psi.

The reactant and product are shown in the following reaction scheme 12.

(Reaction scheme 12)

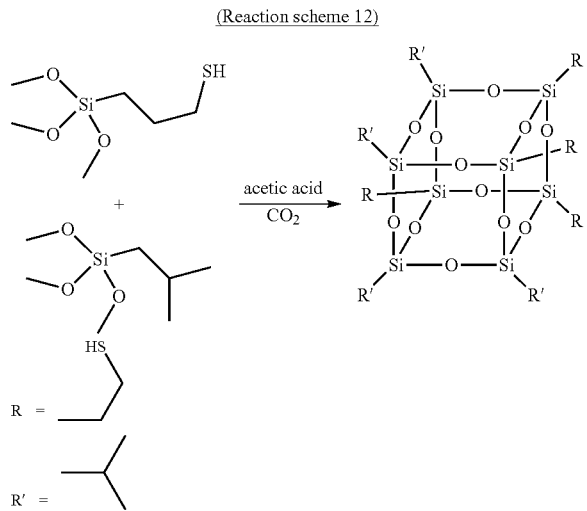

In order to remove the unreacted material and byproducts, the liquid carbon dioxide having a pressure of 1,500 psi and a temperature of 20° C. is flown at a speed of 20 mL/min. After the carbon dioxide is slowly removed, the product is decanted by using hexane and is filtered. As a result, a white solid is obtained and dried in a vacuum. It has been found that the yield is 90.8%.

Embodiment 18

Embodiment 18 relates to a method for manufacturing the polysilsesquioxane (PSSQ) by adopting an Octenyl functional group using Trichlorosilane and a propyl functional group. 3.5 g of Trichlorocyclopentylsilane, 2.53 g of the Trichloro(propyl)silane, and the magnetic bar are supplied to the 30 mL high-pressure reactor. Then, the reactor is closed and the carbon dioxide having a temperature of 50° C. and a pressure of 2,000 psi is injected into the inside of the reactor.

While strongly stirring the magnetic bar, the reaction is progressed by injecting 1 g of water into the inside of the reactor by using the carbon dioxide having a temperature of 50° C. and a pressure of 3,000 psi. A white precipitate is produced during the reaction, and the reaction lasts for 24 hours. The reaction is terminated by reducing the temperature and pressure of the reactor to 25° C. and 1,500 psi.

The reactant and product are shown in the following reaction scheme 13.

(Reaction scheme 13)

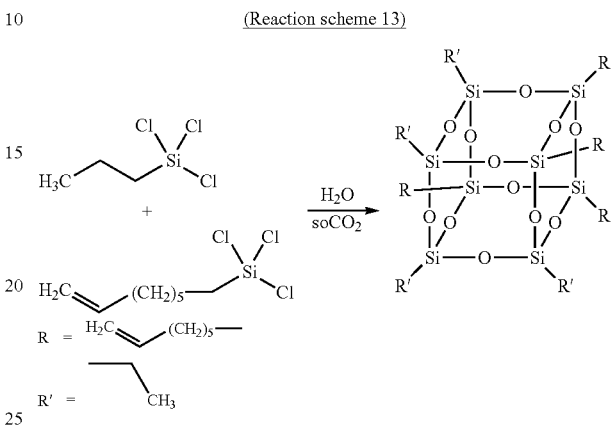

In order to remove the unreacted material and byproducts, the liquid carbon dioxide having the same temperature and pressure is flown at a speed of 20 mL/min. After the carbon dioxide is slowly removed, the produced white solid is dried in a vacuum. It has been found that the yield is 93%.

The present invention has been described with reference to the accompanying drawings. This is just one of various embodiments including the subject matter of the present invention and intends to allow those skilled in the art to easily embody the present invention. It is clear that the present invention is not limited to the above-described embodiments. Therefore, the scope of the present invention should be construed by the following claims. Without departing from the subject matter of the present invention, all the technical spirits within the scope equivalent to the subject matter of the present invention is included in the right scope of the present invention by the modifications, substitutions, changes and the like. Also, it is clear that some of the drawing configuration are intended for more clearly describing the configuration and are more exaggerated or shortened than the actual one.

INDUSTRIAL APPLICABILITY

The present invention provides a method for manufacturing the polysilsesquioxane (PSSQ) within the carbon dioxide solvent through the control of the pressure and temperature within a reactor by the state changes, e.g., a liquid state or supercritical state, of carbon dioxide as a solvent which is environmentally friendly and pollution-free, that is to say, by making use of the fact that the solubility of reactant and product is changed according to the pressure and temperature in manufacturing the polysilsesquioxane (PSSQ).

Therefore, the present invention is required to be immediately applied to the relevant business, so that it has very large industrial applicability.

What is claimed is:
1. A method for manufacturing polysilsesquioxane (PSSQ), the method comprising:
   (i) preparing a silane compound;
   (ii) preparing a carbon dioxide solvent;

(iii) injecting the silane compound into a reactor;
(iv) increasing a pressure and temperature within the reactor, and changing a state of the carbon dioxide solvent into a liquid state or a supercritical state by injecting the carbon dioxide solvent into the reactor, wherein the pressure and temperature are increased from 1,000 to 5,000 psi and from 30 to 80° C., respectively;
(v) supplying water and a catalyst to the reactor;
(vi) inducing hydrolysis and a condensation reaction by increasing the temperature within the reactor;
(vii) precipitating a polysilsesquioxane (PSSQ) product substituted with a functional group by controlling the temperature and pressure within the reactor; and
(viii) separating the silane compound of an unreacted material within the reactor from the polysilsesquioxane (PSSQ) of a product.

2. The method of claim 1, wherein the silane compound is represented by $RSiZ_3$,
wherein R is an organic substituent and corresponds to hydrogen, a substituted or unsubstituted aliphatic hydrocarbon group having 1 to 30 carbon atoms, a substituted or unsubstituted aromatic hydrocarbon group having 6 to 30 carbon atoms, a substituted or unsubstituted alicyclic hydrocarbon group having 3 to 30 carbon atoms, a substituted or unsubstituted silyl group having 1 to 30 carbon atoms, a substituted or unsubstituted allyl group having 3 to 30 carbon atoms, a substituted or unsubstituted acyl group having 2 to 30 carbon atoms, a substituted or unsubstituted vinyl group having 2 to 30 carbon atoms, a substituted or unsubstituted amine group having 1 to 30 carbon atoms, a substituted or unsubstituted acetate having 2 to 30 carbon atoms, or alkali metal, Z is a substituent which is hydrolyzed and corresponds to Cl, Br, I or alkoxy group.

3. The method of claim 1, wherein the polysilsesquioxane (PSSQ) comprises a compound of the following chemical formula (1) as a monomer,
wherein R is an organic substituent and corresponds to hydrogen, a substituted or unsubstituted aliphatic hydrocarbon group having 1 to 30 carbon atoms, a substituted or unsubstituted aromatic hydrocarbon group having 6 to 30 carbon atoms, a substituted or unsubstituted alicyclic hydrocarbon group having 3 to 30 carbon atoms, a substituted or unsubstituted silyl group having 1 to 30 carbon atoms, a substituted or unsubstituted allyl group having 3 to 30 carbon atoms, a substituted or unsubstituted acyl group having 2 to 30 carbon atoms, a substituted or unsubstituted vinyl group having 2 to 30 carbon atoms, a substituted or unsubstituted amine group having 1 to 30 carbon atoms, a substituted or unsubstituted acetate having 2 to 30 carbon atoms, or alkali metal Chemical formula (1)

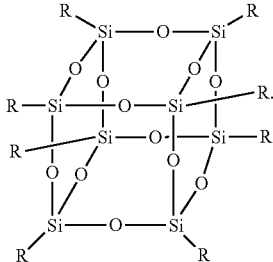

4. The method of claim 1, wherein at least one of an acid catalyst and/or a base catalyst is selected as the catalyst in the step (v).

5. The method of claim 4, wherein the acid catalyst in the step (v) further comprises at least one of hydrochloric acid, sulfuric acid, nitric acid, acetic acid, phosphoric acid, phosphoric ester, activated clay, iron chloride, boric acid, trifluoro acetic acid, trifluoro methane sulfonic acid, and p-toluenesulfonic acid, and wherein the base catalyst in the step (v) further comprises at least one of hydroxide of alkali metal or alkali earth metal, alkoxide of alkali metal or alkali earth metal, tetra alkyl ammonium hydroxide, and amine compounds.

6. The method of claim 1, wherein, in the step (vi), the temperature within the reactor is increased to 30 to 80° C. and the reaction is performed for 18 to 30 hours.

7. The method of claim 1, wherein, in the step (vi), after the water and catalyst are supplied, the temperature of the reactor is increased, so that a solubility within the carbon dioxide of the silane compound is increased and reaction of the product in the liquid or supercritical carbon dioxide is also promoted.

8. The method of claim 1, wherein, in the step (vii), the temperature is controlled to less than 45° C. and the pressure is controlled to be less 1,700 psi, so that the polysilsesquioxane (PSSQ) of the product is precipitated and the silane compound of the unreacted material remains dissolved in the carbon dioxide solvent.

9. The method of claim 1, wherein, in the step (viii), the silane compound of the unreacted material, which has been melted in an upper portion of the reactor, is removed by flowing the liquid carbon dioxide to the reactor.

10. The method of claim 1, further comprising, after the step (viii), controlling the pressure to a normal pressure by opening a valve connected to the outside of the reactor, discharging the carbon dioxide in the form of gas, which remains in the reactor, and obtaining the polysilsesquioxane (PSSQ) of the product precipitated on the bottom of the reactor.

11. The method of claim 1, wherein the silane compound corresponds to at least any one selected from the group consisting of (3-Chloropropyl)trimethoxysilane, (3-bromopropyl)trimethoxysilane, (3-Iodopropyl) trimethoxysilane, (3-Aminopropyl)trimethoxysilane, (3-Mercaptopropyl)trimethoxysilane, Trimethoxy [3-(methylamino) propyl] silane, Trimethoxy (7-octen-1-yl) silane, [3-(2-aminoethylamino) propyl] trimethoxysilane, N1-(3-trimethoxysilylpropyl) diethylene triamine, 3-(trimethoxysilyl) propyl methacrylate, (3-glycidyloxy-propyl) trimethoxysilane, 3-(trimethoxysilyl) propyl acrylate, N-[3-(trimethoxysilyl) propyl] aniline, (3-chloropropyl) triethoxysilane, (3-aminopropyl) triethoxysilane, (3-Mercaptopropyl)trimethoxysilane, and (3-glycidyloxy-propyl) triethoxysilane.

12. The method of claim 1, wherein the silane compound corresponds to at least any one selected from the group consisting of Trimethoxy (propyl) silane, Isobutyl (trimethoxy)silane, Trimethoxy (octyl) silane, Hexadecyl trimethoxysilane, Trimethoxy (octadecyl) silane, [3-(diethylamino) propyl] trimethoxysilane, (N,N-dimethylaminopropyl) trimethoxysilane, Trimethoxy (3,3,3-trifluoropropyl) silane, Trimethoxy-(2-phenylethyl) silane, 1-[3-(trimethoxysilyl) propyl] urea, Trimethoxy [2-(7-oxabicyclo [4,1,0] hept-3-yl) ethyl]silane, n-propyltriethoxysilane, 3-(triethoxysilyl) propionitrile, Triethoxy (isobutyl) silane, Triethoxy Pentyl silane, Hexyl triethoxysilane, Triethoxy (octyl) silane, 3-cyano-propyltriethoxysilane, N-octadecyl triethoxysilane, cyclo pentyl trimethoxysilane, (Triethoxysilyl) cyclohexane, 3-[bis (2-hydroxyethyl) amino] propyl-triethoxysilane, 1H, 1H, 2H, 2H-Perfluorooctyl triethoxysilane, 1H, 1H, 2H, 2H-Perfluorodecyl triethoxysilane, [3-[tri (ethoxy) silyl] propyl] urea or [3-[tri (methoxy) silyl] propyl] urea.

* * * * *